No. 866,100. PATENTED SEPT. 17, 1907.
J. B. WATKINS.
GRAIN AND SEED HULLER.
APPLICATION FILED OCT. 4, 1906.
4 SHEETS—SHEET 3.
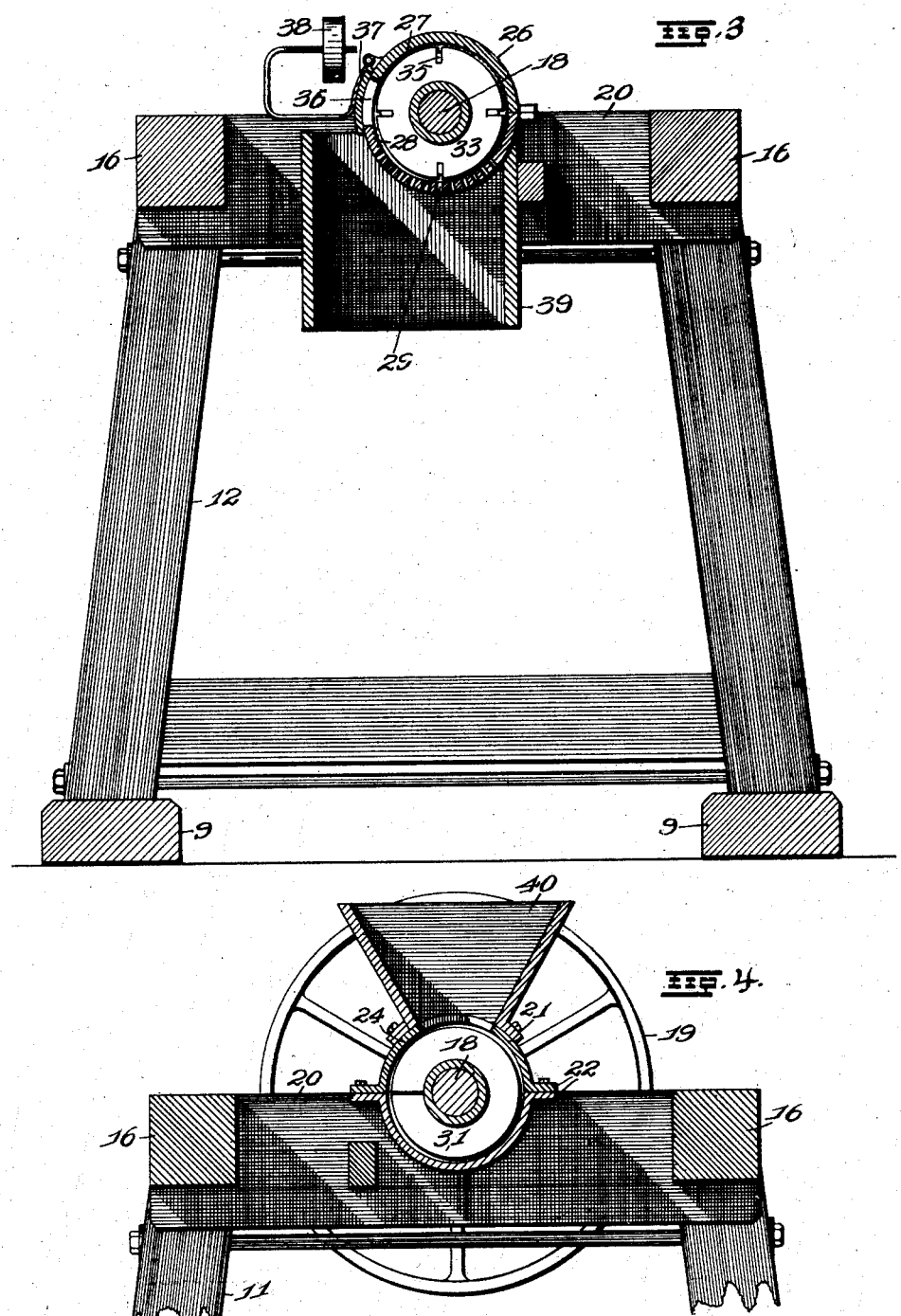

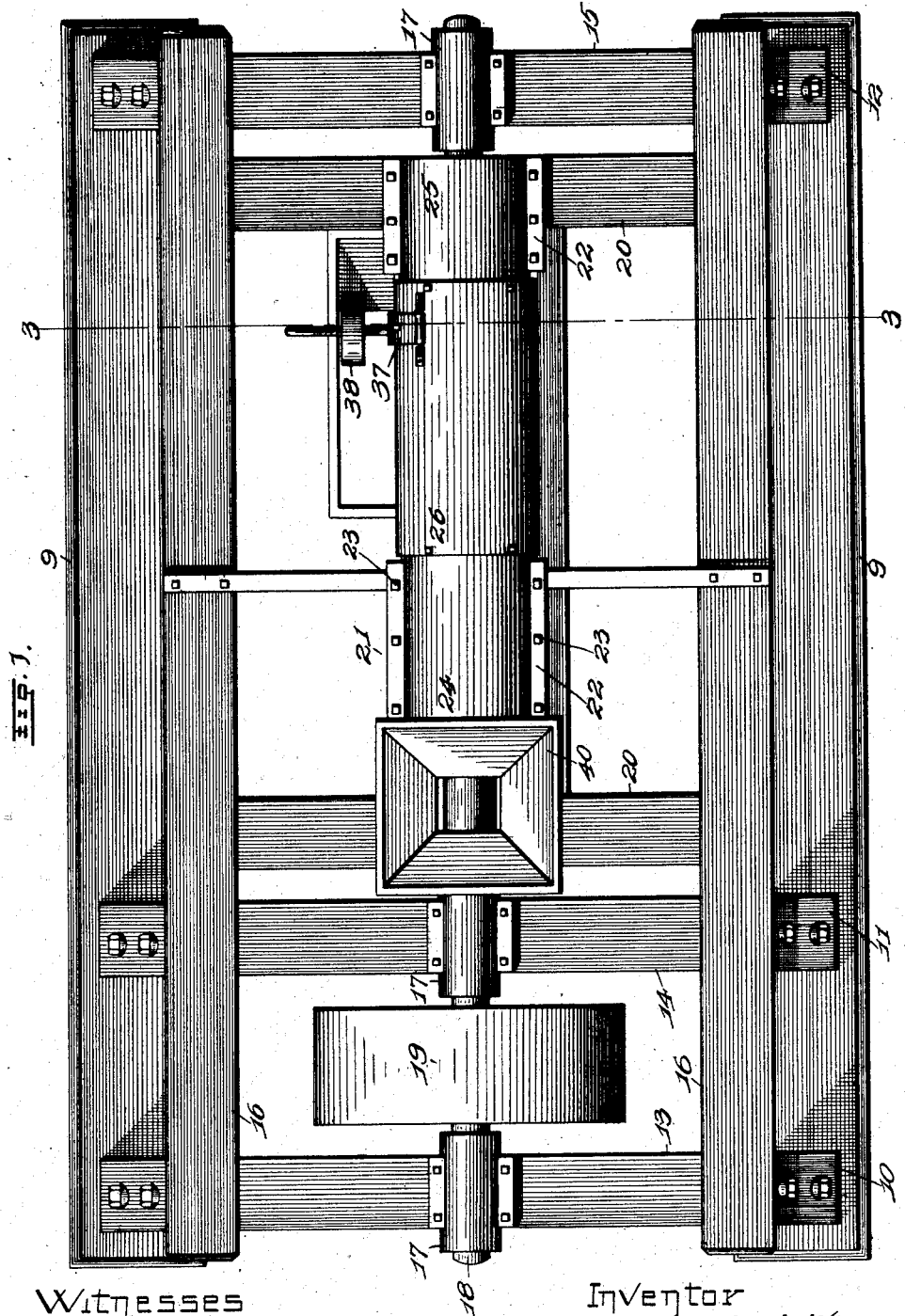

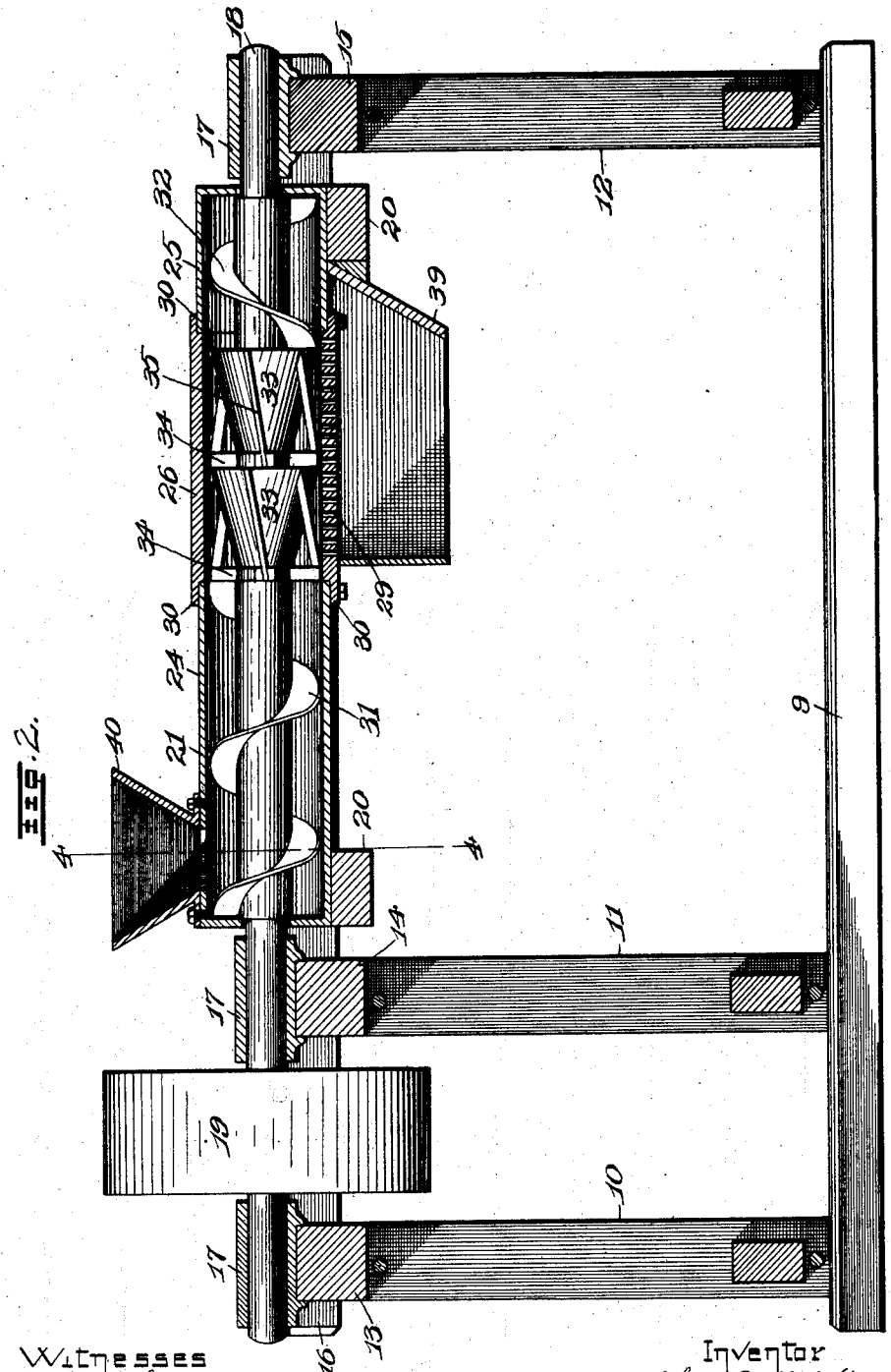

No. 866,100. PATENTED SEPT. 17, 1907.
J. B. WATKINS.
GRAIN AND SEED HULLER.
APPLICATION FILED OCT. 4, 1906.
4 SHEETS—SHEET 4.
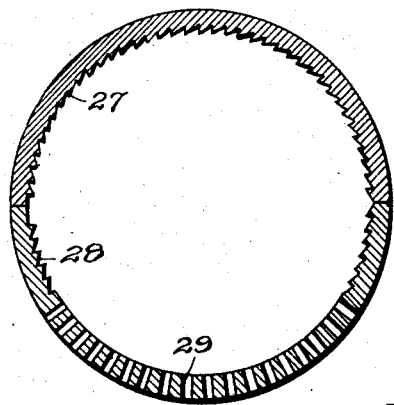
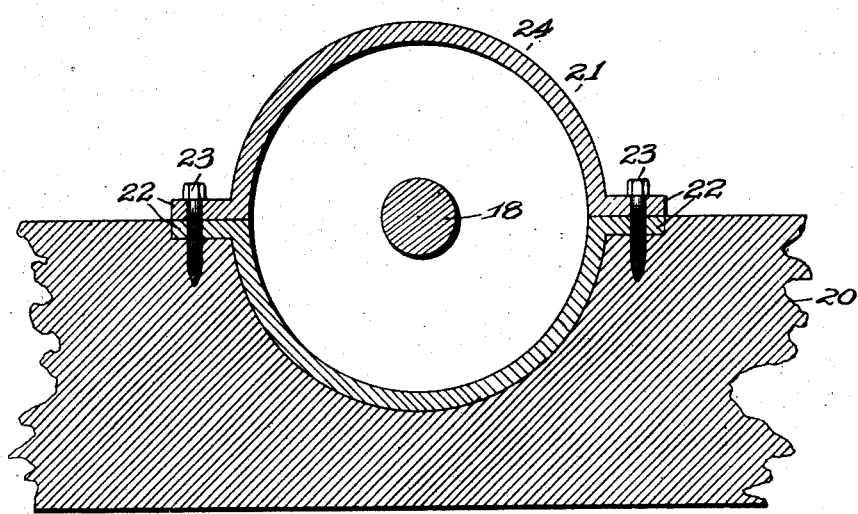
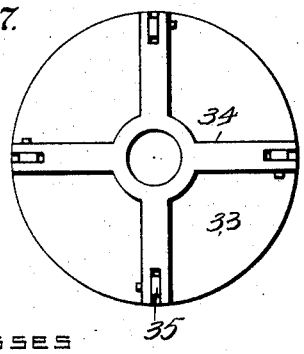
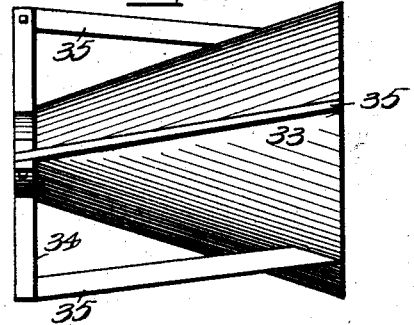
Witnesses
Inventor
John B. Watkins
by Hopkins & Ericks Attys

UNITED STATES PATENT OFFICE.

JOHN B. WATKINS, OF ST. LOUIS, MISSOURI.

GRAIN AND SEED HULLER.

No. 866,100.  Specification of Letters Patent.  Patented Sept. 17, 1907.

Application filed October 4, 1906. Serial No. 337,489.

*To all whom it may concern:*

Be it known that I, JOHN B. WATKINS, a citizen of the United States, and resident of St. Louis, Missouri, have invented certain new and useful Improvements in Grain and Seed Hullers, of which the following is a specification.

This invention relates to improvements in grain and seed hullers, and consists in the novel arrangement, construction and combination of parts as will be fully hereinafter described and claimed.

The object of my invention is to construct a device to hull grains and seeds such as corn, wheat, cotton seed and the like by pressing it in a cylinder and agitating the contents by a right and left hand conveyer.

A further object of my invention is to provide a conveyer mechanism whereby the grains and seeds are conveyed to a certain location by a cylinder and then discharged through an opening when under a certain degree of pressure.

In the drawings: Figure 1 is a top plan view of my complete invention. Fig. 2 is a vertical, central, sectional view of the same. Fig. 3 is a vertical, cross-sectional view taken on the line 3—3 of Fig. 1. Fig. 4 is a vertical, cross-sectional view taken on the line 4—4 of Fig. 2. Fig. 5 is an enlarged, detail cross-sectional view of the sleeve with which the grain or seed contacts during the action of hulling. Fig. 6 is a vertical, cross-sectional view showing the manner in which the cylinder is retained in position upon the supporting frame. Fig. 7 is a detail end view of the agitator cone made use of in carrying out my invention. Fig. 8 is a plan view of the same.

In the construction of my invention I provide a suitable frame consisting of base sections 9, uprights 10, 11 and 12, cross bars 13, 14 and 15, and horizontal supporting bars 16. Upon the cross bars 13, 14 and 15 are mounted journal-bearings 17 in which is revolubly mounted a shaft 18. Upon said shaft 18 and located between the two forward bearings 17 is a pulley 19 by which the shaft is revolved.

To the horizontal supporting bars 16 I secure a pair of cylinder supporting bars 20, the center of each is provided with a semi-circular recess to receive the ends of the cylinder 21. The cylinder 21 is constructed in halves which are each provided with projecting flanges 22 by which the said cylinder is retained in rigid position upon the supporting bars 20 by bolts or lag screws 23. The said cylinder 21 is also composed of two sections 24 and 25 and to the inner ends of said sections is attached the sleeve 26 which is also constructed in halves, the inner surface of the upper half being provided with corrugations or teeth 27 and the lower half being provided with corrugations or teeth 28, and a series of discharge openings 29. The corrugations or teeth 28 on the lower half are inclined in an opposite direction to the corrugations or teeth in the upper half. The object of this is to remove every particle of hull from the seed or grain while contacting with the surface of the sleeve. The sleeve 26 is held in position against the ends of the sections 24 and 25 of the cylinder by the projecting flanges 30. The purpose of constructing the sleeve in halves and separate from the remaining portion of the cylinder is to be able to readily remove the sleeve from the cylinder to replace the same after it has become worn.

On the shaft 18 and within the cylinder 21 I provide conveyers 31 and 32, the conveyer 31 being a right hand screw and the conveyer 32 a left hand screw. Upon said shaft and between the conveyer 31 and 32 I provide the double cone 33 and at the apex of each cone is located a spider 34 to which are connected agitating arms 35 which project from the ends of the spider to the base of each cone, and are arranged at an angle opposite to the right hand conveyer, the object of this being to retain the seed or grain within that portion of the cylinder occupied by the corrugated sleeve, and the tendency of the cone is to force the grain or seed against the roughened surface of the sleeve and the tendency of the agitators is to agitate the grain while in this operation. The use of the left hand conveyer 32 is to prevent the grain or seed from lodging within that end of the cylinder in which the conveyer is located, and this conveyer acts as a retarder head compressing the grain or seed between the two conveyers until the said grain or seed receives a certain degree of pressure; then the hulled material will pass out through the opening 36 formed in the sleeve by automatically opening the door 37 which is provided with a regulating weight 38 acting the same as a safety valve, and permitting the material to escape only when under a certain degree of pressure. The smaller particles of hull are permitted to pass out through the openings 29 formed in the lower half of the sleeve, thus allowing the seed or grain after being hulled to pass out through the opening 36.

Beneath the cylinder and supported to the frame I provide a chute 39 which catches the material and delivers it to any suitable receptacle placed thereunder. The material is admitted into the cylinder through the hopper 40 located on the forward upper end of the cylinder, and is fed therein in any desired manner.

Referring to the cones made use of in carrying out my invention I provide elongated slots in the spider and in the base of the cones in which the agitators are supported. The purpose of the slots is to permit the agitators to be adjusted within the cylinder so as to acquire the proper result in bringing the seed or grain in contact with the inner surface of the sleeve.

I may if desired arrange my cylinder in vertical form depending upon the location of the building in which it is placed.

Having fully described my invention, what I claim is:

1. A device of the class described comprising a cylinder formed of two sections, a sleeve located between said sections, the inner periphery being provided with teeth or corrugations, the said sleeve provided with an outlet, and a plurality of discharge openings, a valve covering the outlet and provided with a weight for regulating the tension of the valve against the sleeve, a right and left hand conveyer mounted within the cylinder, a cone located upon the shaft between the right and left hand conveyer to compress the material against the inner periphery of the sleeve between the right and left hand conveyer, and discharge the same through the discharge opening under a certain degree of pressure, substantially as specified.

2. A device of the class described comprising a cylinder mounted upon a frame, a conveyer revolubly mounted within said cylinder, a retarder head located at one end of the cylinder, cones located within the cylinder, agitators carried by the cones, the said cones and agitators located between the conveyer and retarder head, and a sleeve having a roughened inner surface carried by the cylinder with which the material is to be brought in contact to be hulled, and discharged through the discharge opening under pressure, substantially as specified.

In testimony whereof, I have signed my name to this specification, in presence of two subscribing witnesses.

JOHN B. WATKINS.

Witnesses:
W. C. ESSMUELLER,
ALFRED A. EICKS.